United States Patent [19]

Karner

[11] Patent Number: 4,683,558
[45] Date of Patent: Jul. 28, 1987

[54] CONTROL SYSTEM FOR INCLINED IMPACT-TYPE SURFACE SEISMIC SOURCE

[75] Inventor: Gary M. Karner, Allen, Tex.

[73] Assignee: Atlantic Richfield Company, Los Angeles, Calif.

[21] Appl. No.: 860,966

[22] Filed: May 8, 1986

[51] Int. Cl.[4] ............................................ H04R 23/00
[52] U.S. Cl. ................................... 367/189; 181/113; 181/114; 181/121; 181/111
[58] Field of Search ................... 367/189, 190, 16, 19, 367/56, 75; 181/108, 111, 113, 114

[56] References Cited

U.S. PATENT DOCUMENTS

| | | | |
|---|---|---|---|
| 4,059,820 | 11/1977 | Turpening | 181/113 |
| 4,284,165 | 8/1981 | Airhart et al. | 181/119 |
| 4,291,780 | 9/1981 | Fulkerson | 181/121 |
| 4,354,572 | 10/1982 | Martin | 181/114 |
| 4,611,171 | 9/1986 | Woods | 367/19 |

OTHER PUBLICATIONS

Sheriff et al., *Exploration Seismology*, Cambridge Univ. Press, 1977, p. 191.

*Primary Examiner*—Charles T. Jordan
*Assistant Examiner*—John W. Eldred
*Attorney, Agent, or Firm*—Robert M. Betz

[57] ABSTRACT

Multiple vehicle-transported impact-type surface seismic sources designed to shoot along slant paths to create combined compressional and shear wave pulses in the earth are provided with radio controlled actuators. The azimuth of each shooting path is automatically referenced to magnetic north so that signals of equivalent wave form contents are produced despite vehicle misalignments and without reliance upon individual vehicle operators.

10 Claims, 6 Drawing Figures

CONTROL SYSTEM FOR INCLINED IMPACT-TYPE SURFACE SEISMIC SOURCE

BACKGROUND OF THE INVENTION

1. Field of the Invention

This invention relates generally to the field of seismic prospecting and more particularly to a method and system for aligning the shooting paths of impact-type surface seismic sources.

2. Description of the Prior Art

An impact-type seismic source of the type described in U.S. Pat. No. 4,284,165, entitled "Acoustic Pulse Generator", issued Aug. 18, 1981 to Tom P. Airhart et al, herein incorporated by reference, is used to generate and record compressional waves, commonly termed P-waves. In such a device, in order to get proper results, the longitudinal axis of the cylindrical actuator housing along which an impact mass is propelled toward an earth-contacting base plate must be perpendicular to the plane of the bottom surface of such base plate in contact with the earth. This is true for non-horizontal as well as horizontal surfaces. If such perpendicularity is not maintained a significant portion of the available energy will be expended in producing shear waves of SH or SV type. In a P-wave generator, this would be inefficient and could complicate the task of seismic waves analysis and interpretation.

Conversely, one may desire to create and record a seismic pulse which possesses components of both P-waves and shear waves, either SH or SV type, in certain proportion depending upon the subsurface formation characteristics under investigation. An impact-type seismic generator of the type described above whose impact mass is propelled to its target along an inclined shooting path of variable direction is described in commonly-assigned co-pending U.S. patent application Ser. No. 676762, filed Nov. 3, 1984, in the name of Tom P. Airhart and entitled "Mounting and Control Means for Full Wave Form Seismic Source". In a device as described is such application the actuator housing is supported within a pair of "gimbal" type frames carried on a transport vehicle. These frames provide two degrees of rotational freedom for the actuator. Thus, the actuator may rotate within a first frame about a first axis transverse to the longitudinal vehicle axis. The first frame together with the first axis is in turn rotatable within a second frame about a second axis perpendicular to the first and extending along the longitudinal vehicle axis. The second frame is fixed to the vehicle chassis. By rotating the actuator about both these "forward-back" and "left-right" axes, it is possible to make the axis of the actuator housing, and hence the "shooting path" of the impact mass, coincide with any prescribed direction in space. The wave content of any seismic wave generated and recorded with such a device depends upon (1) the azimuth of the shooting path followed by the impact mass with respect to a line between the source and the recording geophones (the "seismic line") and (2) the angle of inclination of such path referenced, for the reasons explained above, to a perpendicular to the plane of the base plate. Hereafter in the detailed description to follow, the term "inclination" as applied to such a path shall be understood to mean the angle it makes with such perpendicular.

In seismic prospecting it is frequently desirable to simultaneously operate multiple vehicle-transported sources offset at about the same distance from an array of series of arrays of recording geophones. In order that the resultant seismic wave forms reinforce each other for maximum amplification, all such source vehicles must be headed in the direction of the seismic line or at the same angle to such line. The reason is that heretofore shooting paths and adjustments in direction have always been referenced to vehicle heading. This is sometimes difficult if not impossible to achieve with any degree of reliability. Visual sighting between any vehicle and the nearest geophone array or between vehicles may be hindered by terrain, vegetation or weather. Consequently, individual vehicles may be randomly misaligned with each other and with the seismic line. This is particularly troublesome when inclined impacts are programmed, because of the directionality of the energy distribution of SH and SV type shear waves produced with such impacts. If individual source vehicles have different headings and all actuators are rotated on the above-described gimbal frames through the same "forward-back" and "left-right" angles to reach the prescribed direction, the resulting paths will clearly differ from each other. Therefore, the wave forms recorded along the seismic line will also differ in content as to compressional and shear wave components. Vertical summation of these individual recordings will necessarily introduce distortion and degrade the quality of the seismic data.

SUMMARY OF THE INVENTION

The present invention contemplates a system for controlling the azimuths and inclinations of the respective shooting paths of a plurality of impact-type vehicle-transported surface seismic sources wherein means carried on each said vehicle are provided for adjusting the shooting path of its source by rotation of such path about two mutually perpendicular gimbal axes oriented in known relation to the heading of such vehicle, said system comprising compass means carried on each said vehicle for determining such vehicle heading, means dependent upon said vehicle heading for calculating the angular positions of said shooting path with respect to said gimbal axes which align said shooting path with desired values of azimuth and inclination, and means dependent upon said calculations for actuating said shooting path adjustment means to effect such alignment. In a more limited aspect said calculating means is a digital computer provided with signal inputs representative respectively of said desired azimuth and inclination and said vehicle heading, and said actuating means comprises in combination first and second command signals provided by said computer whose amplitudes are respectively representative of said angular positions and first and second servo means respectively driven by said command signals so as to control said shooting path adjustment means.

In a still more limited aspect, means are provided for telecommunicating to each vehicle computer a pair of signals representing respectively said desired values of shooting path azimuth and inclination.

In accordance with an alternate embodiment of this invention each of said vehicle computers is pre-programmed with a table of preselected pairs of values of shooting path azimuth and inclination which may be sequentially applied by such computer preparatory to successive seismic shots in substitution for telecommunication of like pairs of the aforesaid signals.

The present invention further contemplates the method for orienting the respective shooting paths of a plurality of vehicle-transported impact-type surface seismic sources so that seismic signals of substantially equivalent wave form content are generated thereby, each said source being provided with means for adjusting its shooting path by rotation thereof about two mutually perpendicular gimbal axes oriented in predetermined relation to the heading of its respective vehicle, the method comprising the steps of determining the initial azimuth of each said vehicle heading, calculating in relation to said vehicle heading the angular positions of each said shooting path with respect to its gimbal axes adapted to align said shooting path with desired values of azimuth and inclination, and actuating said adjustment means responsive to said calculations so as to effect such alignment.

It is therefore a general object of this invention to provide a method and system for aligning the respective shooting paths of a plurality of impact-type seismic sources so that such paths have a common azimuth and inclination.

It is a more particular object of this invention to provide such a method and system wherein control of such alignment and inclination is removed from individual vehicle operators.

Other objects and advantages of this invention will be evident from the following detailed description when read in conjunction with the accompanying drawings which illustrate the invention.

DETAILED DESCRIPTION OF THE PREFERRED EMBODIMENT

Figure 1:
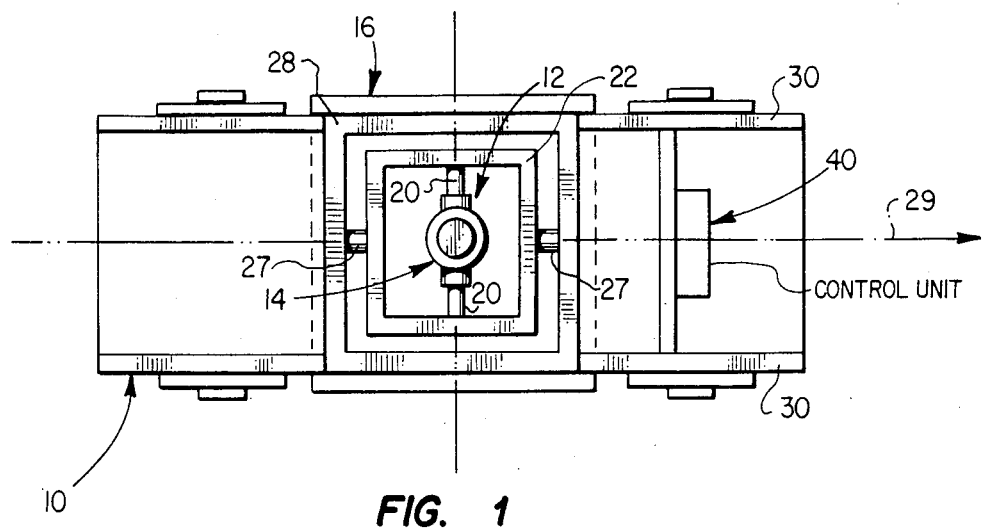
FIG. 1 is a simplified plan view of an impact-type vehicle-transported seismic source adapted for use in a preferred embodiment of this invention.
Figure 2:
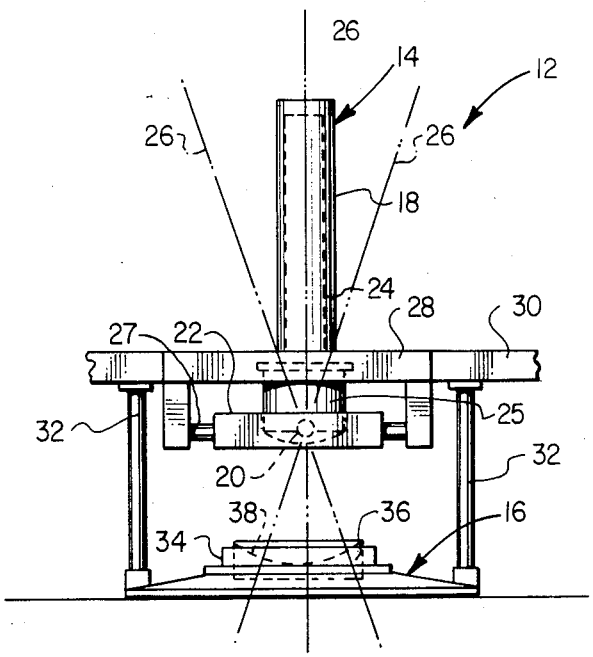
FIG. 2 is a simplified elevational view of the seismic source of FIG. 1.

As illustrated in FIGS. 1 and 2 the invention depends upon using a transport vehicle 10 on which is carried an impact-type seismic source 12. The general operation of source 12 is in accord with the teachings of U.S. Pat. No. 4,284,165, referenced above, and other related prior art teachings, and is well known to the art.

As described in considerable detail in U.S. patent application Ser. No. 676762, also referenced above, source 12 comprises an actuator 14 and a base plate 16 which may be lowered to rest upon the earth beneath vehicle 10. Actuator 14 generally comprises a hollow cylindrical housing 18 supported for rotation on oppositely extending axles 20 within open frame 22, an elongated piston 24 slidably supported within housing 18, and propulsion means (not shown) for driving piston 24 downwardly along longitudinal axis 26 of housing 18. Piston 24 terminates at its lower end in enlarged diameter impact mass 25. When a firing signal is given, piston 24 is driven downwardly so that mass 25 strikes base plate 16 and thus generates a seismic signal in the earth.

Frame 22 is itself rotatably mounted on oppositely extending axles 27 within frame 28, which is fixed to parallel longitudinal chassis members 30 of vehicle 10. The axis of axles 27 coincides with the longitudinal axis 29 of vehicle 10, and extends at right angles to the axis of axles 20. In this way frames 22 and 28 act like "gimbal" rings and give actuator 14 two degrees of rotational freedom. Axles 20 permit actuator 14 to tilt in a forward or backward direction with respect to vehicle 10. Axles 27 permit "left-right" tilt. When actuator 14 is tilted left or right on axles 27, the axis of axles 20 is correspondingly tilted out of the plane of chassis members 30 but remains at right angles to axles 27.

As detailed in U.S. patent application Ser. No. 676762, angular tilt of actuator 14 and frame 22 is conveniently accomplished by means of electrically controlled hydraulic cylinders (not shown) operating in push-pull relation. The assembly of such hydraulic cylinders with related components and their mode of operation do not, per se, form a part of this invention. Conventional means for performing the tilt motions described are well known to the art. It is apparent that by rotating housing 18 of actuator 12 about both axles 20 and 27 one can make longitudinal axis 26 coincide with any desired direction in space. The direction of axis 26 along which mass 25 travels to impact base plate 16 thus establishes a "shooting path" which determines the wave content of the resultant seismic signal.

Base plate 16 is typically raised for transport or lowered into shooting position by means (not shown) carried on vehicle 10. After base plate 16 is lowered to earth, adjustable upstanding hydraulic supports 32 fixed to chassis members 30 are extended downwardly to bear against baseplate 16. In this way the weight of vehicle 10 is transferred to base plate 16 for stability and lateral support. Base plate 16 is provided with a hollow central hub 34 within which a striker plate 36 is slidably mounted. The upper surface 38 of plate 36 is concave. Its contour is such that when actuator 14 is fired along a slant path, i.e. so that housing axis 26 is tilted away from a perpendicular to the plane of base plate 16, the path of mass 25 will always remain perpendicular to surface 38 at the center line of impact. This way the energy of mass 25 is most efficiently coupled into the earth in the form of combined shear and compressional waves.

Vehicle 10 carries a computerized control unit 40 whose function it is to determine and store the initial azimuth and inclination of the shooting path prior to redirection for any given shot, to receive radio signals transmitting selected values of shooting azimuth and inclination for such shot, to calculate from these data the necessary adjustment of the shooting path of actuator 14 by rotation of housing 18 on axles 20 and 27 so that the angular coordinates of axis 26 coincide with any desired values, and to generate suitable command signals for directing such rotational movements. The details of operation of control unit 40 will be set forth below.

Figure 3:
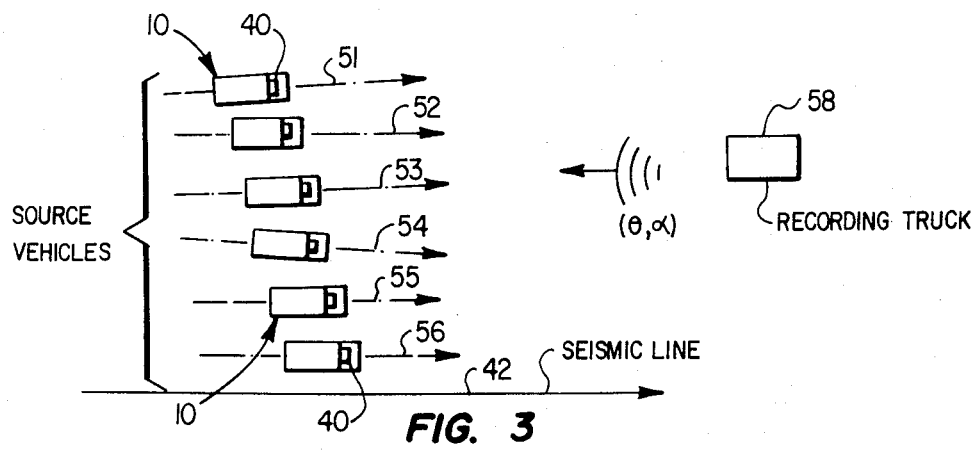
FIG. 3 is a diagrammatic illustration of a field array of vehicle-transported sources of the type shown in FIG. 1 together with a recording truck for transmission of shooting path signals.

FIG. 3 illustrates a field operation in which multiple vehicles 10 each carrying a source 12 are maintained in echelon formation as they progress from each shooting location to the next along the direction of seismic line 42. Although the individual operators of vehicles 10 try to align their vehicles with seismic line 42, in practice for reasons explained above, the vehicle headings indicated by reference numerals 51 through 56 may be misaligned with seismic line 42 and with each other. When signals designating a desired shooting azimuth, $\theta$, and inclination, $\alpha$, are transmitted to each vehicle 10 by radio from recording truck 58 the system and method to be described automatically compensates for any such misalignment.

Figure 4:
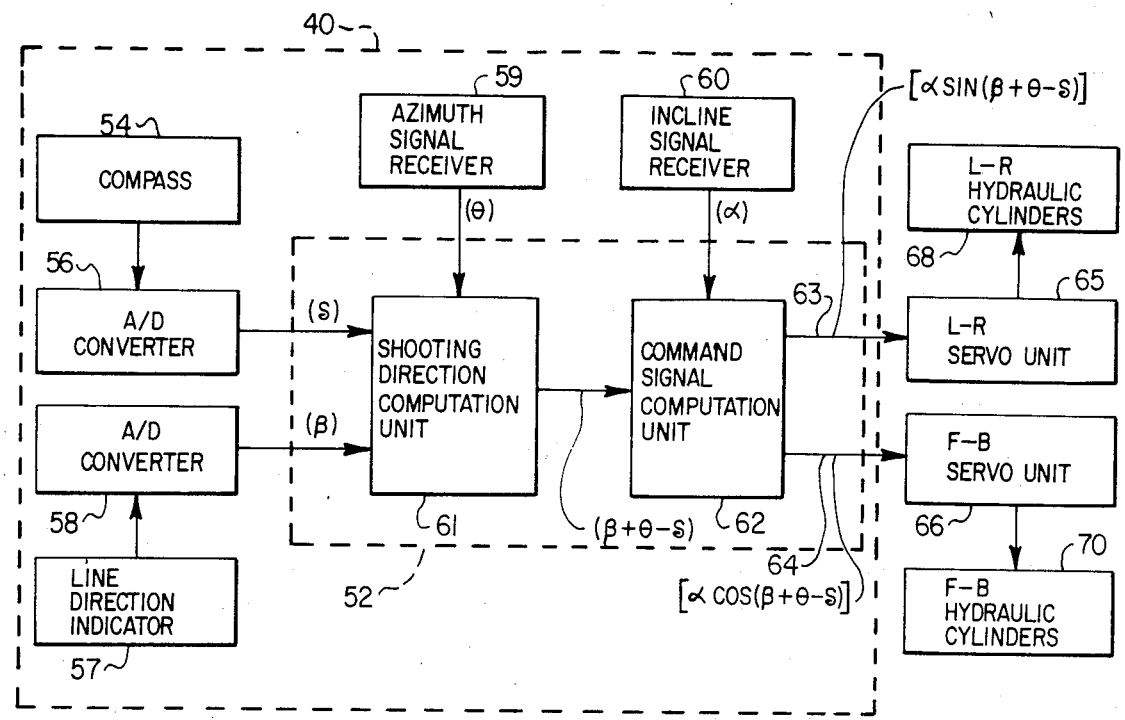
FIG. 4 is a block diagrammatic illustration of a source control system in accordance with the preferred embodiment of this invention.

FIG. 4 illustrates in block form the various functional elements of each control unit 40. A signal processor 52, which may, for example, be one of many conventional types of digital computer generally termed micro processors, is provided with signal inputs from three different sources as follows. First, the analog readings of a compass 54 which indicates the azimuthal heading of vehicle 10, are transformed by analog-to-digital converter 56 to a digital azimuth signal, $\delta$. Secondly, a digital signal indicating the azimuth, $\beta$, of the transit measured direction of seismic line 42 is provided by line direction indicator 57 through analog-to-digital converter 58. Lastly, radio signals are received by processor 52 indicative of selected shooting direction azimuth, $\theta$, referenced to the direction of seismic line 42, and inclination, $\alpha$, referenced to a perpendicular to the plane of base plate 16. Signal receivers 59 and 60 are provided to detect signals $\theta$ and $\alpha$ respectively. Computational unit 61 of processor 52 combines the signal inputs $\beta$, $\delta$ and $\theta$ and provides to computation unit 62 a composite signal of value $\beta+\theta-\delta$. Computational unit 62 receives this composite signal together with the signal representing inclination, $\alpha$, and generates from these inputs first and second command signals 63 and 64 having amplitudes $\alpha \sin (\beta+\theta-\delta)$ and $\alpha \cos (\beta+\theta-\delta)$ respectively. Those skilled in the data processing art will have no difficulty in devising internal logic and associated programming in order to carry out the above functions of units 61 and 62. Accordingly, detailed description there-of is deemed unnecessary and is omitted. These first and second signals are fed respectively to "left-right" and "forward-back" servo units 65 and 66 which in turn acturate "left-right" and "forward-back" hydraulic cylinders 68 and 70 respectively which control rotation of housing 18 about axles 27 and 20. The amplitudes of the signals 63 and 64 are calculated such that the resulting rotation of housing 18 about axles 27 and 20 will adjust axis 26 so that the shooting path of mass 25 is in accord with the selected values of aximuth and inclination. Servo units 65 and 66 may be of conventional construction well known to the art wherein solenoids (not shown) are provided which open or close actuating valves on hydraulic cylinders 68 and 70 responsive to the presence or absence of signals imputs to said solenoids. Such inputs continuously represent the difference between the amplitude of signals 63 and 64 and conventional feedback signals such as may be provided by linear variable displacement transducers (not shown) indicating the incremental rotation of axis 26 about axles 27 and 20.

Figure 5:
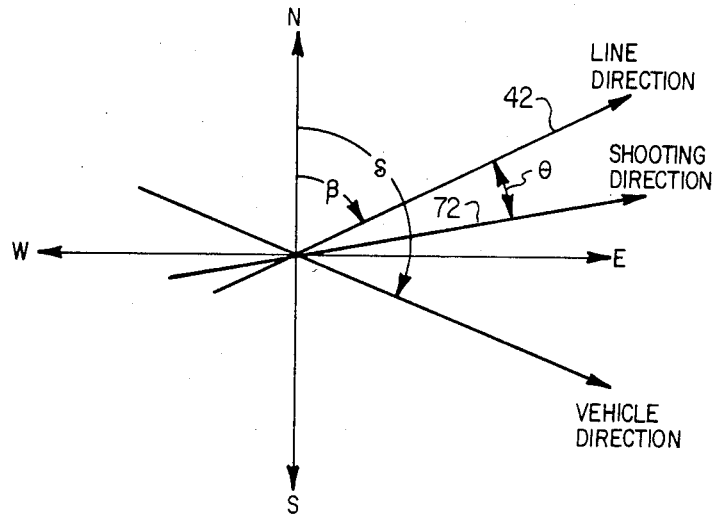
FIG. 5 is a graph depicting the various azimuthal relationships involved in calculating the command signals outputs of the source control system of FIG. 4.
Figure 6:
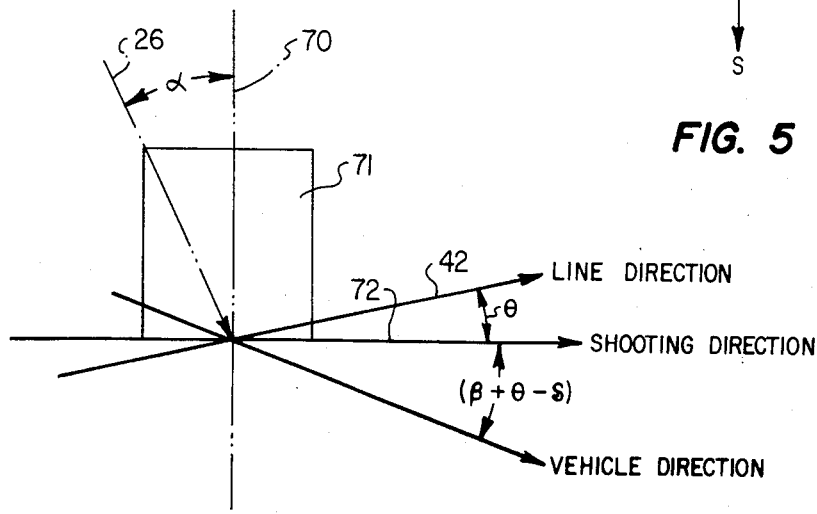
FIG. 6 is a diagram illustrating the manner in which shooting path inclinations are measured.

FIG. 5 illustrates the various angular relationships discussed above, exaggerated for clarity. It is apparent from a consideration of FIG. 5 that the angular quantity, $\beta+\theta-\delta$, represents the difference between the heading 29 of any vehicle 10 and the selected shooting azimuth. In FIG. 6, inclination $\alpha$, is referenced to direction 70 which represents a perpendicular to the plane of base plate 16 for any vehicle 10. It is important to understand that inclination is measured in a vertical plane 71 which includes the horizontal projection 72 of the shooting path of axis 26 upon the earth. If the planes of base plates 16 of vehicles 10 are not parallel such as when they lie on differently slanted earth surfaces, directions 70 will correspondingly differ among such vehicles 10. Thus, the resultant shooting paths of all sources 12 may in fact be different while the wave forms of their seismic signal are the same.

The particular values of command signals 63 and 64 set forth above expressed as trigonometric functions of the various angles involved are based upon the way in which axles 20 and 27 are related to the longitudinal axis 29 of any vehicle 10. If adjustment of the shooting path is to be accomplished by utilizing a different set of rotational axes the corresponding values for signals 63 and 64 will change correspondingly as determined by conventional trigonometric methods.

It should be evident that the automated system described above removes control of shooting path orientation from individual vehicle operators and insures that all sources 12 are creating wave forms of substantially equal wave form content. Nevertheless, it should be understood that by referencing all shooting azimuths to a northerly direction by continuous compass reading, the calculation of necessary angular rotation on axles 20 and 27 and actuation of servo units 65 and 66 may be accomplished manually within the scope of this invention. Also, one may easily provide means (not shown) for radioing back to recording truck 58 the actual azimuths and inclination of each vehicle 10 together with "timebreak" information, i.e., indication of actual impact time for each of sources 12, all to verify that each source 12 has been properly operated.

As an alternative to the transmission of desired values of shooting path azimuth, $\theta$, and inclination, $\alpha$, to vehicles 10 by radio one may elect to preprogram all signal processors 52 with one or more pairs of such values. These values may then be sequentially processed in the manner detailed above in order to generate command signals equivalent to command signals 63 and 64.

Compass 54 may be either of the magnetic variety or a gyro compass which instead referenced to geographic or true north. Ideally, consistent measuring techniques should be used to determine the azimuth of vehicle 10 and that of seismic line 42.

Changes may be made in combination and arrangement of elements as heretofore set forth in the specification and shown in the drawings, it being understood that modification may be made in the embodiments disclosed without departing from the spirit and scope of the invention as defined in the following claims.

What is claimed is:

1. A system for controlling the azimuths and inclinations of the respective shooting paths of a plurality of separate vehicle-transported surface seismic sources, each said source having an impact mass, means for propelling said mass along said shooting path to strike an earth contacting base plate, and means for adjusting each said shooting path by rotation thereof about two mutually perpendicular gimbal axes oriented in predetermined relation to the heading of the associated vehicle, said system comprising:

(a) means for determining each such vehicle heading:
    (b) means dependent upon each said vehicle heading for calculating the angular positions of each said shooting path with respect to said gimbal axes which align said shooting path with desired values of azimuth and inclination; and (c) means responsive to said calculation means for actuating each said shooting path adjustment means to effect such alignment.

2. A system as in claim 1 wherein said means for determining said vehicle heading is a gyro compass.

3. A system as in claim 1 wherein each said calculating means is a digital computer provided with signal inputs representing respectively said desired values of azimuth and inclination and said vehicle heading.

4. A system as in claim 3 wherein the path of one of said mutually perpendicular gimbal axes fixed in coincidence with the longitudinal axis of said vehicle and the path of the other of said gimbal axes is variable in a plane perpendicular to said vehicle longitudinal axis.

5. A system as in claim 4 wherein said actuation means comprises in combination first and second command signals provided by said computer whose amplitudes are respectively representative of said angular position and first and second servo means respectively driven by said command signals so as to control said shooting path adjustment means.

6. A system as in claim 5 wherein said first and second command signals have amplitudes $\alpha\cos(\beta+\theta-\delta)$ and $\alpha\sin(\beta+\theta-\delta)$ respectively, and are respectively designed to control rotation about said variable and fixed path gimbal axes, where $\alpha$ = the inclination of said desired shooting path referenced to a perpendicular to the plane of said baseplate.

$\theta$ = the azimuth of said desired shooting path referenced to the direction of a preselected seismic line $\beta$ = the azimuth of said seismic line referenced to magnetic north $\delta$ = the azimuth of said vehicle heading referenced to magnetic north and the quantity $\beta+\theta-\delta$ = the azimuth difference between said vehicle heading and the direction of said shooting path.

7. A system as in claim 3 further including means for telecommunicating said signal inputs representing desired values of azimuth and inclination to each said digital computer from a remote source.

8. A system as in claim 7 including means responsive to completion of said alignment for transmitting back to said remote signal source the adjusted values of azimuth and inclination for each said source.

9. The method of orienting the respective shooting paths of a plurality of vehicle-transported impact-type surface seismic sources; each said source having an impact mass, means for propelling said mass along said shooting path to strike an earth contacting base plate, and means for adjusting said shooting paths by rotation thereof about two mutually perpendicular gimbal axes oriented in predetermined relation to the heading of the associated vehicle, said method comprising the steps of:

(a) determining each said vehicle heading;

(b) calculating in relation to each said vehicle heading the angular positions of each said shooting path with respect to its gimbal axes adapted to align said shooting path with desired values of azimuth and inclination; and (c) actuating said adjustment means responsive to said calculations so as to effect such alignment.

10. The method of orienting the shooting path of an impact type surface seismic source having an impact mass, means for propelling said mass along said shooting path to strike an earth-contacting base plate, and means for adjusting said shooting path by rotation thereof about two mutually perpendicular axes one of which is fixed in a plane parallel to the earth's surface; said method comprising the steps of:

(a) determining the heading of said fixed axis;

(b) designating values of azimuth and inclination which define a desired direction for said shooting path;

(c) calculating as a function of said heading the angular positions said shooting path with respect to said rotational axes adapted to align said shooting path with said desired direction; and (d) actuating said adjustment means so as to effect said alignment.

* * * * *